(12) United States Patent
Asahara

(10) Patent No.: US 7,191,059 B2
(45) Date of Patent: Mar. 13, 2007

(54) NAVIGATION SYSTEM

(75) Inventor: Tomoyuki Asahara, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 326 days.

(21) Appl. No.: 10/699,870

(22) Filed: Nov. 4, 2003

(65) Prior Publication Data
US 2004/0133345 A1 Jul. 8, 2004

(30) Foreign Application Priority Data
Jan. 7, 2003 (JP) .............................. 2003-001475

(51) Int. Cl.
G01C 21/28 (2006.01)

(52) U.S. Cl. ........................ 701/209; 701/207; 701/208

(58) Field of Classification Search ........ 701/208–210, 701/200–204; 340/990, 995.1, 995.24; 455/456.1; 382/113, 305; H04Q 7/20; H04M 3/42; G01C 21/00, G01C 21/06; G06K 9/00; G08G 1/23
See application file for complete search history.

(56) References Cited

U.S. PATENT DOCUMENTS

| 5,903,228 | A | * | 5/1999 | Ohgaki et al. ........... 340/995.1 |
| 5,922,040 | A | * | 7/1999 | Prabhakaran ............. 701/117 |
| 5,938,718 | A | * | 8/1999 | Morimoto et al. .......... 701/201 |
| 5,941,930 | A | * | 8/1999 | Morimoto et al. .......... 701/201 |
| 5,944,768 | A | * | 8/1999 | Ito et al. .................... 701/200 |
| 6,009,374 | A | * | 12/1999 | Urahashi .................... 701/209 |
| 6,128,571 | A | * | 10/2000 | Ito et al. .................... 701/201 |
| 6,144,318 | A | * | 11/2000 | Hayashi et al. ........ 340/995.19 |
| 6,148,090 | A | * | 11/2000 | Narioka ...................... 382/113 |
| 6,317,684 | B1 | * | 11/2001 | Roeseler et al. ............ 701/202 |
| 6,347,278 | B2 | * | 2/2002 | Ito ............................. 701/200 |
| 6,366,852 | B2 | * | 4/2002 | Irie et al. .................... 701/211 |
| 6,459,782 | B1 | * | 10/2002 | Bedrosian et al. ..... 379/201.08 |
| 6,810,327 | B2 | * | 10/2004 | Akashi ....................... 701/209 |
| 2002/0103597 | A1 | | 8/2002 | Takayama et al. |
| 2003/0109266 | A1 | * | 6/2003 | Rafiah et al. ............... 455/456 |
| 2004/0036622 | A1 | * | 2/2004 | Dukach et al. ............ 340/69.6 |
| 2005/0165543 | A1 | * | 7/2005 | Yokota ....................... 701/204 |

FOREIGN PATENT DOCUMENTS

DE 100 59 746 A1 10/2001
DE 100 38 242 A1 2/2002

(Continued)

OTHER PUBLICATIONS

O'Leary, Mapquest and Maps On Us: Top Web Map services, Online vol. 21 No. 5 Sep./Oct. 1997, pp. 56-58.*

(Continued)

Primary Examiner—Cuong Nguyen
(74) Attorney, Agent, or Firm—Birch, Stewart, Kolasch & Birch, LLP

(57) ABSTRACT

When a specific point and images of information associated therewith, which are retrievable via a communication line such as the Internet are displayed, character data extracting means extracts character string data of time information or charge information from among images. Route searching means searches for routes based on conditions set in position information on the specific point, and in time information or charge information extracted by the character data extracting means.

11 Claims, 5 Drawing Sheets

FOREIGN PATENT DOCUMENTS

| | | |
|---|---|---|
| EP | 1 271 101 A2 | 1/2003 |
| GB | 0002985.0 * | 2/2000 |
| JP | 2924885 * | 5/1997 |
| JP | 2000-314633 A | 11/2000 |
| JP | 2000-337911 A | 12/2000 |
| JP | 2001-133282 A | 5/2001 |
| JP | 2001-141501 A | 5/2001 |
| JP | 2001255160 A | 9/2001 |
| JP | 2002157253 A | 5/2002 |
| JP | 2002-334139 A | 11/2002 |
| JP | 2002323335 A | 11/2002 |
| JP | 20022334139 A | 11/2002 |
| JP | 2000-046575 A | 2/2005 |
| WO | 01/13069 A1 | 2/2001 |
| WO | 01/46649 A1 | 6/2001 |

OTHER PUBLICATIONS http://www.geosys.com/cgi-bin/genobject/.*

* cited by examiner

NAVIGATION SYSTEM

This Nonprovisional application claims priority under 35 U.S.C. § 119(a) on patent application No(s). 2003-001475 filed in Japan on Jan. 7, 2003, the entire contents of which are hereby incorporated by reference.

BACKGROUND OF THE INVENTION

1. Field of the Invention

The present invention relates to a navigation system, and more particularly, to a navigation system capable of utilizing information retrieved from external resources such as home pages on the Internet and e-mails for its navigation function.

2. Description of the Related Art

A navigation system has widely been put to practical use in which the system guides a driver during driving a route extending from the current position of his vehicle to the destination. This navigation system has functions to display maps neighboring the vehicle on its monitor as the vehicle travels, or to specify an arbitrary point to display a map surrounding thereof. Recently, a navigation system has been generally known in which the system has functions to browse the contents of home pages on the Internet and to send and receive e-mails by connecting the system to the Internet via a mobile telephone. This assists a driver to determine whichever destination should be selected with reference to information on facilities and resorts retrieved from home pages on the Internet. Furthermore, a method has also been proposed involving extraction of character information (latitude and longitude, address, ZIP code, and telephone number, etc.) devoted to specifying a location of a facility or the like based on a displayed home page, and utilization of information for navigating functions such as destination setting and map display.

A conventional navigation system includes connecting means for connecting with a computer network; browsing means for browsing information sent through the computer network; extracting means for extracting character information specifying a location among the information sent through the computer network; and retrieving means for retrieving position information corresponding to the character information from the character information dedicated to specifying a location extracted by the extracting means. For instance, JP, 2000-337911, A (Paragraph Number 0015)

However, the conventional navigation system utilizes information on a point, but fails to do other additional information (times, charges, etc.) on the point even though home pages on the Internet provide various information on the point. Therefore, a driver is denied an access to the information on the point even if a driver reached the point, for the reason that a facility being set as the destination are already out of business hours, and charges exceed a driver's budget.

SUMMARY OF THE INVENTION

The present invention has been made to solve the above-mentioned problems. An object of the present invention is to provide a navigation system capable of effectively utilizing specific information on a point and that associated therewith for route searching, which are retrievable via a communication line such as the Internet.

The navigation system according to the present invention includes communication means for receiving information on a specific point via a predetermined communication line; display control means for displaying on predetermined display means an image that contains the information on a specific point received by the communication means; character data extracting means for extracting character string data of specific information on the specific point from among images displayed by the display control means; and route searching means for searching a route based on conditions set in the position information on the specific point received by the communication means, and in the specific information extracted by the character data extracting means.

Through the above configuration, the present invention provides an effective use of the specific information on the specific point and that associated therewith, which are retrievable via a communication line such as the Internet.

DETAILED DESCRIPTION OF THE PREFERRED EMBODIMENTS

The navigation system of the preferred embodiment according to the present invention will now be described below with reference to the attached drawings.

First Embodiment

Figure 1:
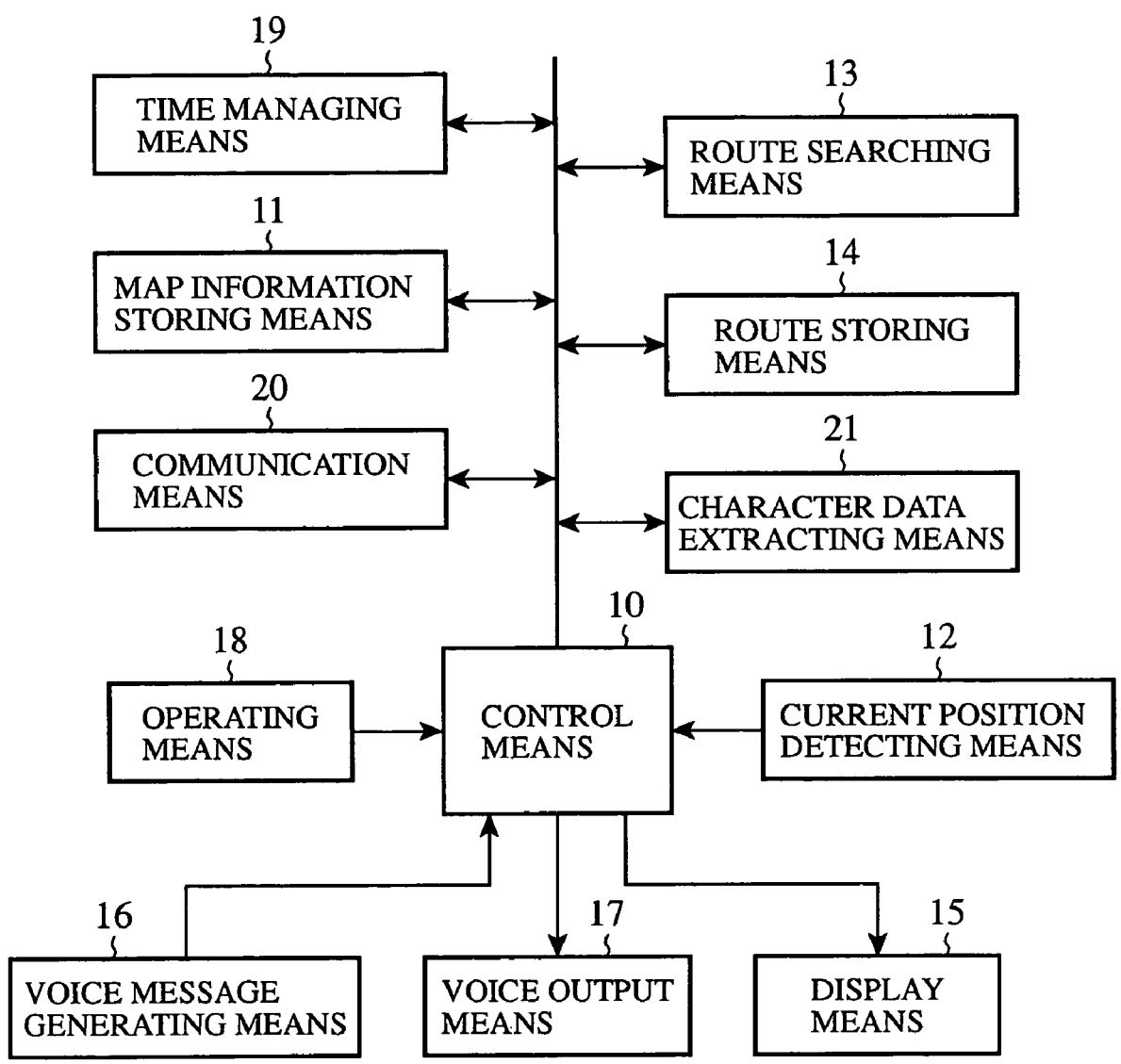
FIG. 1 is a block diagram showing basic functions of a navigation system in the first embodiment according to the present invention.

FIG. 1 is a block diagram showing basic functions of the navigation system in the first embodiment according to the present invention.

Referring to FIG. 1, control means 10 performs various operations in the navigation system, and controls the entire system. Map information storing means 11 stores digitized map information. Current position detecting means 12 detects the current position and the direction of a mobile station equipped with this navigation system. Route searching means 13 retrieves a route between two arbitrary points using map data stored in the map information storing means 11. Route storing means 14 stores routes detected by the route searching means 13.

Display means 15 displays maps stored in the map information storing means 11 and routes stored in the route storing means 14. Voice message generating means 16 has voice information storing means in which words or phrases necessary for a voice guidance message are stored in the form of voice waveform data. When giving voice guidance, the means 16 generates a voice guidance message by selecting and combining the voice waveform data of the words and phrases representative of a corresponding guidance message. Voice output means 17 gives in a voice a user a guidance message generated by the voice message generating means 16.

Operating means 18 manages on/off information of a switch operated by a user and an input signal input by the switch. Time managing means 19 acquires the current times at the current position of his vehicle and at an arbitrary point from GPS data and manages them. Communication means 20 retrieves data from home pages opened on the Internet through a mobile telephone and performs data communications such as sending and receiving of e-mails. Character data extracting means 21 extracts necessary character data used for navigation from home pages and e-mails displayed by the communication means 20.

Figure 2:
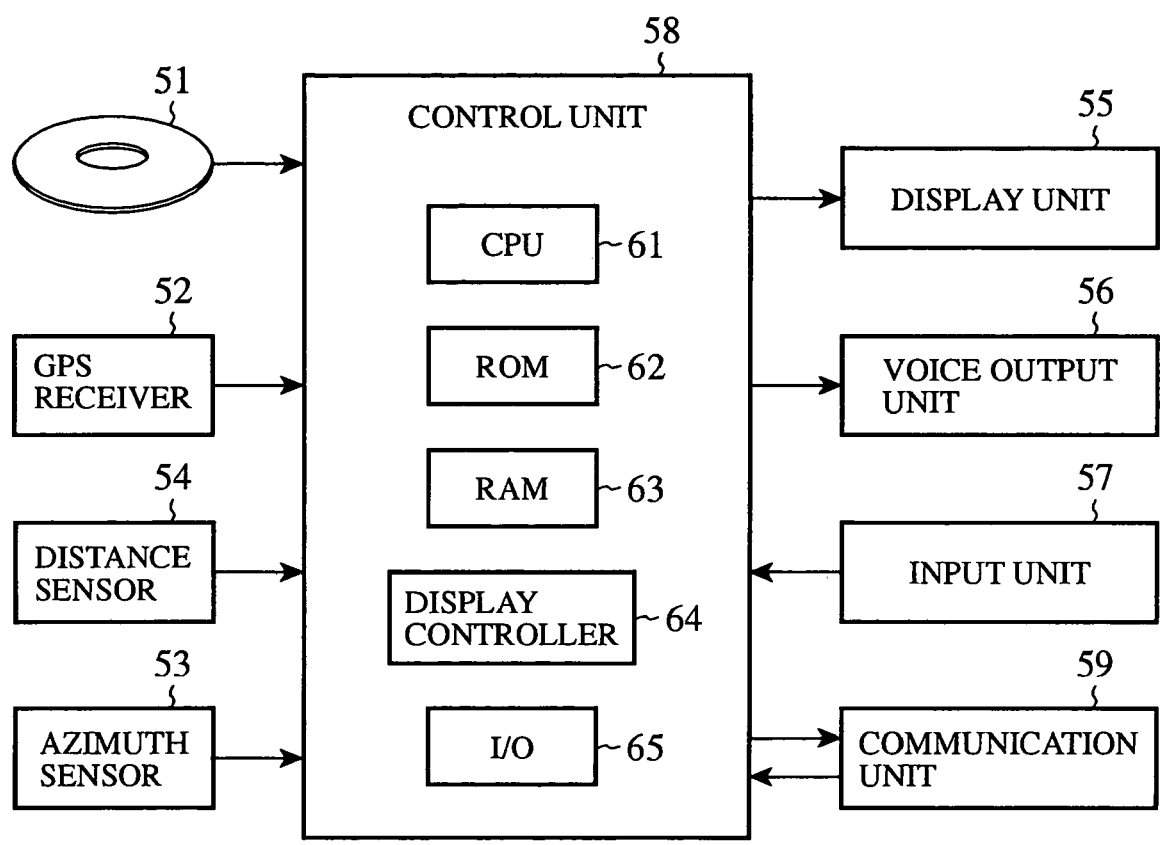
FIG. 2 is a block diagram showing a hardware configuration for realizing the navigation system shown in FIG. 1.

FIG. 2 is a block diagram showing the hardware configuration for realizing the navigation system shown in FIG. 1.

Referring to FIG. 2, a disk 51 corresponds to the map information storing means 11 shown in FIG. 1, and is storage media such as a CD-ROM or a DVD-ROM in which the map information is stored in digital form, the map information being read from the disk by a reading unit (not shown). A GPS (Global Positioning System) receiver 52 receives radio waves from artificial satellites to detect the current position of a mobile station equipped with this navigation system. An azimuth sensor 53 detects an azimuth toward which the mobile station is directed. A distance sensor 54 detects how far the mobile station is traveled. These GPS receiver 52, azimuth sensor 53, and distance sensor 54 correspond to the current position detecting means 12 shown in FIG. 1.

A display unit 55, made of an LCD monitor, for instance, corresponds to the display means 15 shown in FIG. 1, and displays map information and routes. A voice output unit 56 corresponds to the voice output means 17 shown in FIG. 1, and outputs in a voice a guidance message. An input unit 57 corresponds to the operating means 18 shown in FIG. 1, and inputs signals indicative of operation information when a user operates this navigation system. A communication unit 59 corresponds to the communication means 20 shown in FIG. 1, and connects with the Internet through a mobile telephone or the like. A control unit 58 corresponds to the control means 10 shown in FIG. 1, and controls the entire navigation system, or executes various operations.

Within this control unit 58 are provided a CPU 61, a ROM 62, a RAM 63, a display controller 64, and an I/O (input/output unit) 65. The CPU 61 performs computation for route searching and extraction of guidance points. The ROM 62 stores programs and constants the CPU 61 uses in the course of operation. The RAM 63 is a work area for the CPU 61, in which the programs and map data are loaded in various processing steps, and the computed results are written therein. A display controller 64 controls how to the display unit 55 displays. The I/O 65 interfaces between the control unit 58 and the various external units 51–57. The route searching means 13, voice message generating means 16, time managing means 19, and character data extracting means 21 shown in FIG. 1 correspond to functions implemented by processing operations of the control unit 58.

Figure 3:
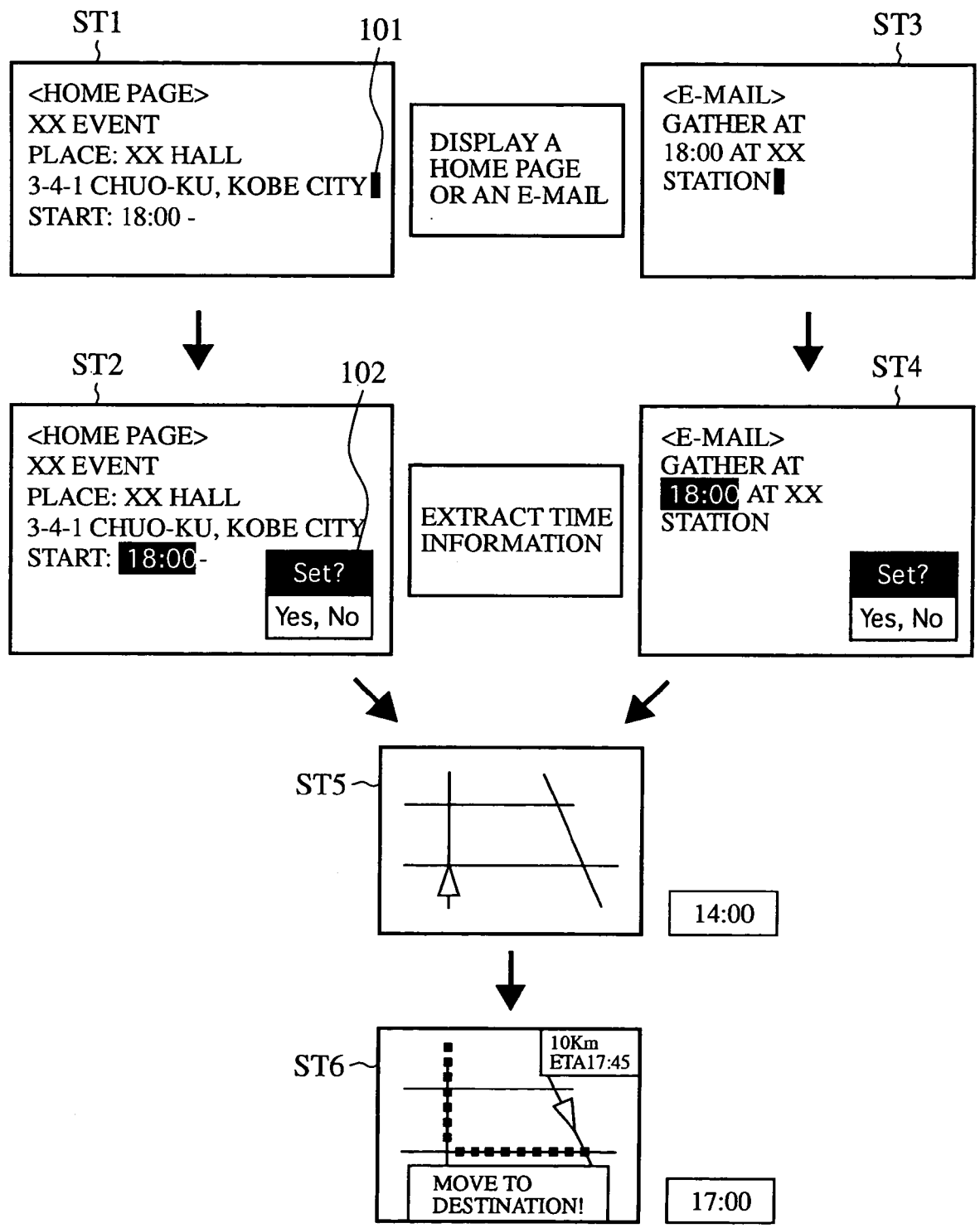
FIG. 3 is a diagram showing exemplary screens displayed on a display unit by the navigation system shown in FIG. 1 and FIG. 2 and transitions of the screens.

FIG. 3 is a diagram showing exemplary screens displayed on the display unit 55 by the navigation system shown in FIG. 1 and FIG. 2 and transitions of the screens.

Sometimes, a home page on the Internet contains time information (business hours etc.) in addition to information on a point. Similarly, position information, particularly on a meeting spot, transmitted by an e-mail is occasionally accompanied with time information (meeting time etc.) in addition to the information on the spot.

The images in step ST1 and step ST2 are images displayed on a display screen of a home page and an e-mail, respectively, when a user gives an operating instruction to the navigation system through the input unit 57 using a remote control unit or the like. A cursor 101 freely moves on the screen on the operating instructions of a user. The user moves the cursor 101 through the input unit 57, and thereby points an arbitrary position on a home page or an e-mail. Moreover, when a user wants to extract characters, for instance, business hours of a facility displayed at a desired position on the screen, the user moves the cursor 101 to a starting point and then to an endpoint of this character string, and subsequently the user performs a predetermined decision operation (for instance, pressing of a decision key of the remote controller) through the input unit 57. This specifies the starting point and the endpoint of the character string.

When extracting a character string, a user may select it manually as mentioned above, or otherwise automatically. For instance, when a number of four figures is separated into two figures by ":" or "-", two figures of the first half is 24 or less, and two figures of the second half is 59 or less, the character string is judged as being time information, and thus the time information is extracted. Moreover, when there appears a numeral before "o'clock" and another numeral before "minutes" in a character string, the character string is also judged as being time information, and thus the time information is extracted.

The images in step ST4 and step ST2 are images showing extraction of the time information, and a selection can be made so as to set the extracted time information from "pop up menu 102" or the like displayed by a key operation or the like. The image in step ST5 is an image of map information when the time information extracted in step ST2 or step ST4 is used as a parameter in route searching. The image in step ST6 is an image of the time information in the case where a route is automatically set and prompts a user to move to the destination regardless of the current position of his vehicle, such that the user arrives at 15 minutes to an expected arrival time set in the time information e.g. 18 o'clock.

Figure 4:
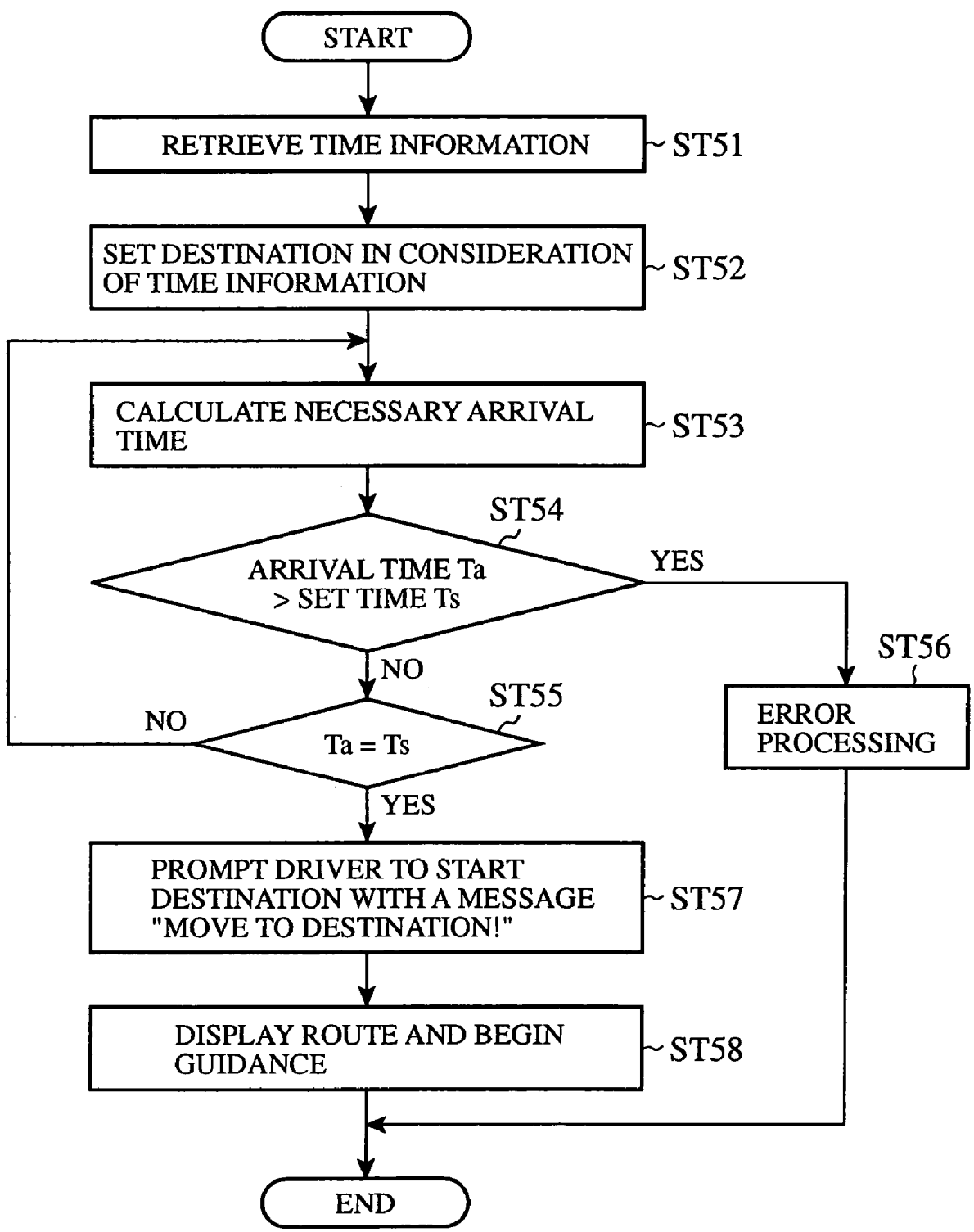
FIG. 4 is a flow chart showing procedures when performing navigation such as destination setting using time information extracted from home pages or e-mails.

FIG. 4 is a flow chart showing procedures when performing navigation such as destination setting using the time information extracted from home pages or e-mails.

When the navigation system is connected with the Internet by the communication means 20 and facility information is retrieved from a home page, the time information is also extracted simultaneously by the character data extracting means 21 (step ST51), and the time information is correlated with the set point in consideration of the extracted time information in order to set the destination (step ST52).

Subsequently, an expected arrival time taken to the set point is calculated (step ST53), and a judgement is made based on the calculated result whether there is a relation Ta>Ts or not, where Ta is an arrival time and Ts is a set time retrieved from home pages (step ST54). Because the arrival time is later than the set time if Ta>Ts, error processing is executed to notify a user that it is expected not to arrive by the set time with an image or a voice message "It is difficult to arrive at the set time," for instance (step ST56).

If the judgement shows that there is a relation Ta≦Ts in step ST54, an additional judgement is made whether there is a relation Ta=Ts or Ta<Ts, (step ST55). If Ta<Ts, the process returns to step ST53 to calculate again a necessary arrival time to the set point, and a comparison is made between the arrival time and the set time in step ST54. Otherwise, if Ta=Ts (in step ST55), the navigation system prompts a user to move to the destination with a message "Move to the destination" (step ST57), and displays routes (step ST58) to begin guidance.

Alternatively, in the comparison between the arrival time Ta and the set time Ts in step ST54 and step ST55, a value Ta=Ts−X and X=15 (minutes) may be set, for instance, such that a user arrives at 15 minutes to the arrival time for meeting. Besides, a value X=−30 (minutes) may be set, for instance, such that a user arrives at 30 minutes after to just arrive at business hours of a facility. Moreover, it is possible for a user to previously set a value of X on a setting screen, and set more than two types of values X1, X2 for the sake of meeting and business hours, respectively.

Facility information in home pages often includes charges such as an admission fee and parking fee. For information on the charges, it is also feasible to extract it in the same manner as the time information, and to execute a search calculation in consideration of it. For instance, when there appears a character of "Yen" after a numeral in a character string, or a numeral after a character of "¥," these numerals can be judged to be a charge.

Figure 5:
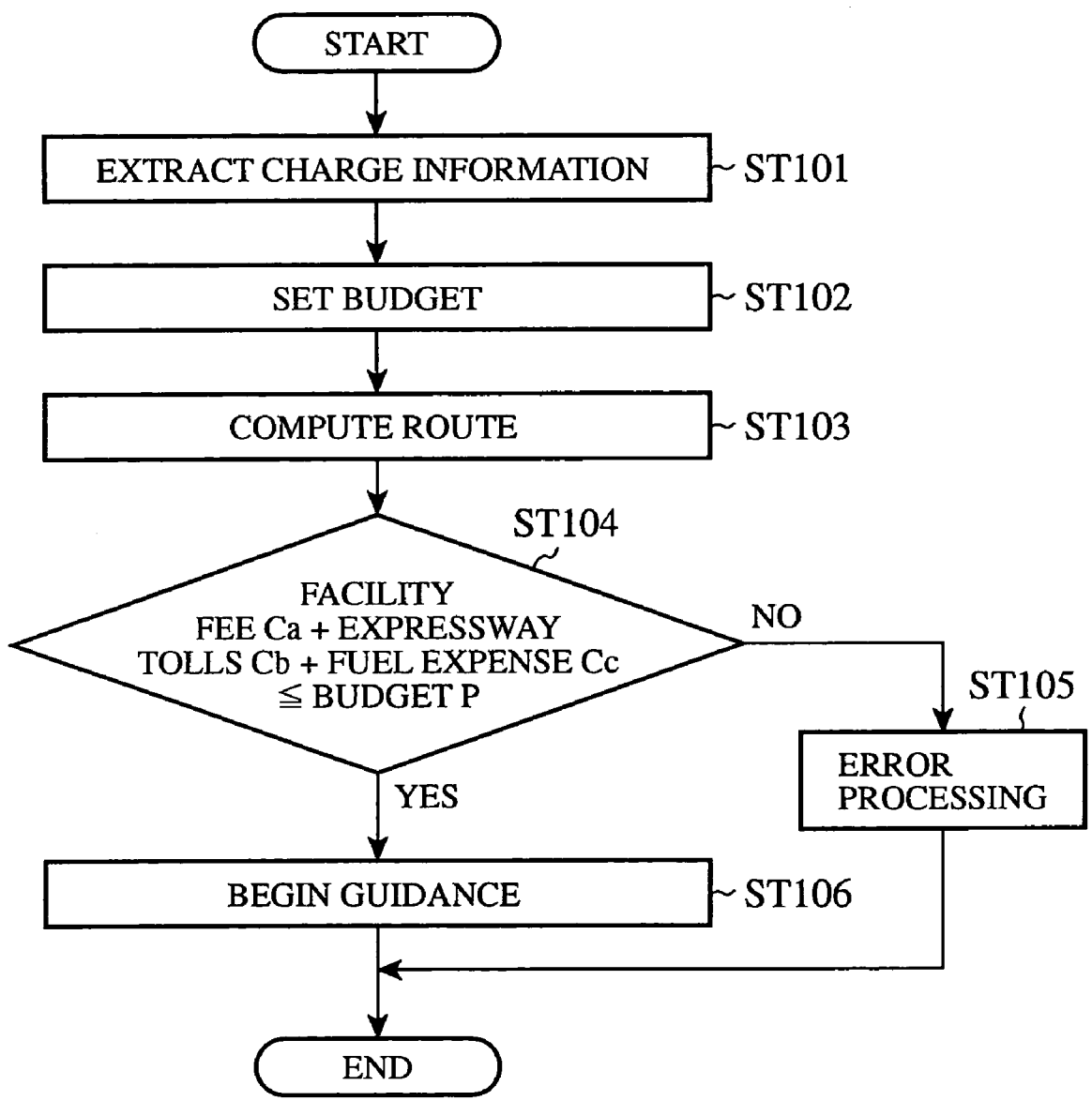
FIG. 5 is a flow chart showing procedures when performing navigation such as destination setting using charge information extracted from home pages or e-mails.

FIG. 5 is a flow chart showing procedures when performing navigation such as destination setting using charge information extracted from home pages or e-mails.

When the navigation system is connected with the Internet by the communication means 20, and retrieves facility information from home pages, the charge information is also extracted by the character data extracting means 21 (step ST101), and the charge information is set with it correlated with the set point. Subsequently, a budget P is set for this traveling to the destination (step ST102). The budget includes charges to be incurred for using a facility, a parking fee, and the like being set as the destination, which can be estimated from the information retrieved from home pages. That is, the budget corresponds to the charge information correlated with the point information retrieved in step ST101 and is the total sum of "fees for using a facility Ca", "tolls for a high way and a toll road Cb" and "fuel expenses Cc". Setting a budget P means retrieving the total sum of these expenses.

After having set the budget P, a route calculation is started in consideration of actually necessary charges C. In that event, traffic frequency of a toll road affecting Cb, and the distance covered affecting Cc are adjusted. Then, routes are calculated on the basis of the adjustment result so that a relation Ca+Cb+Cc≦P is maintained (step ST103).

A judgement is made whether there is a relation Ca+Cb+Cc≦P or Ca+Cb+Cc>P (step ST104). If the judgement shows that there is a relation Ca+Cb+Cc>P, error processing notifying a user that "The expenses exceed the budget" is executed with an image or a voice message (step ST105). Otherwise, if Ca+Cb+Cc≦P, guidance begins after finishing a calculation of an appropriate route that does not go beyond the budget (step ST106).

In passing, the budget set in step ST102 may be registered in advance by a user on a setting screen or the like. Additionally, a plurality of budgets may be registered by application, e.g. traveling, shopping, or the like.

As mentioned above, in the navigation system according to the first embodiment, the communication means 20 receives the time information or the charge information associated with a specific point via a predetermined communication line such as the Internet. The display control means (the display controller 64 in the control unit 58) displays on the predetermined display means 15 an image containing the time information or the charge information on the specific point received through the communication means 20. The character data extracting means 21 extracts character string data of the time information or the charge information from among images displayed by the display control means. The route searching means 13 searches routes based on conditions set in the position information on the specific point received by the communication means 20 and in the time information or charge information extracted by the character data extracting means. Therefore, the navigation system according to the present invention offers an effective use of specific information on the point and that associated therewith for route searching, which are retrievable via a communication line such as the Internet.

In the first embodiment, since the communication means 20 receives information on a specific point from home pages or e-mails on the Internet, the present invention provides an effective use of specific information on the point and that associated therewith for route searching, which are retrievable from external resources such as home pages and e-mails via a communication line such as the Internet.

In the first embodiment, since the character data extracting means 21 extracts character string data of time information from among displayed images, the present invention provides an effective use of the time information (business hours, for instance) on a specific point and that associated therewith for route searching, which are retrievable from external resources such as home pages and e-mails through the Internet.

Additionally, in the first embodiment, since the route searching means 13 searches for routes through which a user will reach a specific point by the time set in the time information extracted by the character data extracting means, the present invention allows route searching so as to arrive in time for an event to be held in the point, for instance.

Furthermore, in the first embodiment, because the character data extracting means 21 extracts character string data of charge information from among displayed images, the present invention offers an effective use of the charge information on a point and that associated therewith for route searching, which are retrievable from external resources such as home pages and e-mails through the Internet.

Moreover, in the first embodiment, since the route searching means 13 searches for routes such that the sum of charges obtained by adding a charge set in the charge information extracted by the character data extracting means 21 and a charge to be taken to a specific point does not go beyond the previously set charge, the present invention avoids situations where a user cannot attain his purpose on account of a shortage of money on hand when the user reached the specific point.

In addition, in the first embodiment, because when the route searching means 13 failed to search for routes that meet conditions set in the specific information extracted by the character data extracting means 21, the display controller 64 gives a user a message representative of the failure, the present invention clarifies what action should taken for such a situation.

What is claimed is:

1. A navigation system comprising:
   a communication unit that receives information on a specific point via a predetermined communication line;
   a display control unit that displays an image containing information on the specific point received by the communication unit on a display;
   a character data extracting unit that extracts a character string including specific information regarding the specific point from among images displayed on the display; and
   a route searching unit that searches routes based on conditions set in position information on the specific point received by the communication unit; and in the specific information extracted by the character data extracting unit.

2. The navigation system according to claim 1, wherein the communication unit receives information on the specific point from home pages on the Internet or e-mails.

3. The navigation system according to claim 1, wherein the character data extracting unit extracts a character string including time information from among displayed images.

4. The navigation system according to claim 3, wherein the route searching unit searches for routes through which a user will be able to reach the specific point by a time set in the time information extracted by the character data extracting unit.

5. The navigation system according to claim 1, wherein the character data extracting unit extracts a character string including charge information from among the displayed images.

6. The navigation system according to claim 5, wherein the route searching unit searches for routes such that the sum of charges obtained by adding a charge included in the charge information extracted by the character data extracting unit and a charge to be incurred does not go beyond a previously set charge.

7. The navigation system according to claim 1, wherein when the route searching unit fails to find routes that meet conditions set in the specific information extracted by the character data extracting unit, the display control unit displays a message representative of the failure.

8. A method of providing navigation assistance, the method comprising:

receiving information on a specific point;

displaying data regarding the specific point on a display;

extracting a character string including detailed information regarding the specific point from the displayed data;

searching routes based on position data associated with the specific point and the detailed information contained in the extracted character string; and displaying a route which meets conditions set in the position information and the detailed information.

9. The method of claim 8, wherein the displayed data is received from the Internet or electronic mail messages.

10. The method of claim 8, wherein the detailed information includes time information.

11. The method of claim 8, wherein the detailed information includes charge information.

* * * * *